(12) United States Patent
Viaud

(10) Patent No.: US 7,165,491 B2
(45) Date of Patent: Jan. 23, 2007

(54) ACTUATOR BETWEEN TENSIONING ARMS

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/110,494

(22) Filed: Apr. 20, 2005

(65) Prior Publication Data
US 2005/0235842 A1    Oct. 27, 2005

(30) Foreign Application Priority Data
Apr. 23, 2004   (EP)   ................................. 04101708

(51) Int. Cl.
*B30B 5/04*    (2006.01)
*A01D 39/00*   (2006.01)

(52) U.S. Cl. .............................. 100/87; 100/88; 56/341

(58) Field of Classification Search .................... 100/5, 100/87, 88, 89; 56/341, 344; 53/211, 215, 53/216, 587
See application file for complete search history.

(56) References Cited

U.S. PATENT DOCUMENTS

| 3,911,641 | A | * | 10/1975 | Miller et al. .................. 53/415 |
| 4,121,513 | A | * | 10/1978 | Kopaska ........................ 100/88 |
| 4,912,918 | A | | 4/1990 | Jennings et al. ............... 56/341 |
| 5,839,362 | A | | 11/1998 | Ratzlaff et al. ................ 100/88 |
| 6,079,324 | A | * | 6/2000 | Feraboli et al. ................ 100/40 |
| 6,530,311 | B1 | | 3/2003 | Wilkens et al. ................ 100/40 |
| 6,622,468 | B2 | * | 9/2003 | Lucand et al. ................. 56/341 |
| 6,640,699 | B2 | * | 11/2003 | Viaud ............................. 100/7 |
| 2004/0031402 | A1 | * | 2/2004 | Viaud ........................... 100/88 |

FOREIGN PATENT DOCUMENTS

| EP | 309 936 | 9/1988 |
| EP | 309 941 | 9/1998 |
| FR | 2793382 A1 * | 11/2000 |

* cited by examiner

*Primary Examiner*—Lowell A. Larson
*Assistant Examiner*—Jimmy Nguyen

(57) ABSTRACT

A round baler having a single set of baling means, such as belts, which are trained over a serious of fixed and mobile rolls to form a bale having a larger diameter. Several loops are formed in the baling means. The loops are controlled by two pivot arms, and the position of these pivot arms is controlled by a common actuator.

9 Claims, 15 Drawing Sheets

ACTUATOR BETWEEN TENSIONING ARMS

TECHNICAL FIELD

This invention relates to crop harvesting apparatus and methods, more particularly relates to a crop baler for making round bales in a continuous manner.

BACKGROUND

Round bales are well known for packaging crop materials. For example, in European Patent EP No. 309 936 B1 to White entitled "Round Baler having Anti-Plugging Means" discloses a round baler with a single set of endless belts, which are routed over a series of fixed and mobile rolls, whereas the mobile rolls are carried on two tensioning arm, which create several loops to provide sufficient bale length to extend over the circumference of a completed bale. A lower tensioning arm is applied by a spring, which extends with additional crop entering the bale chamber.

In yet another reference, European Patent No. EP A1 309 941 to Fell et al., further discloses a round baler with two sets of endless belts and two tensioning arms, which are controlled by means of a single hydraulic cylinder. This hydraulic cylinder is used to control the tension in the two sets of belts to provide for controlled movement of the bale during formation and unloading.

The present invention is related to challenges in forming bales having large diameters such as two meters or greater, while simultaneously using inexpensive equipment such as belts and chains that can be easily manipulated to achieve the desired result. Therefore, there is a need for using only one baling means or one set of baling means, such as flexible belts or a chain and slat assembly, to forming bales with a bigger diameter, such as two meters and greater.

SUMMARY OF THE INVENTION

Preferably, the number of belts, chains or other devices as well as their control means should be kept at a minimum to keep the manufacturing costs at a minimum. Consequently, by using a common control for the two or more pivot arms as opposed to a spring or another control mechanism, the manufacturing and operation costs are reduced.

If three pivot arms are present, pairs of two may be connected and controlled by a common link, cable, or the like. Using one set of baling means for a single bale chamber will provide for equal tension in the entire baling means, will cover the bale circumference more closely than two baling means, which will have an interface and thus a gap and can have loops to provide for enough lengths required to encircle a big bale. The actuator may be driven hydraulically or electrically and may join the pivot arms directly or via links, cables, chains, or the like.

While it is not excluded to use a rotary actuator, a linear actuator, commonly called a hydraulic cylinder, is preferred, since it may apply more power and is easier to connect. Hydraulic and electric drives are easy to control and available on round balers driven by a tractor.

Resistance in the bale forming means against which the actuator is extended or retracted will result in tension in the baling means and this will create a dense bale. Such resistance may be variable during the baling process to provide a dense bale throughout its diameter or a soft core at the beginning and a dense bale later on. By using lever arms to connect the actuator to the pivot arms, it is possible to select the lever arm position with respect to the pivot arm such that the momentum can be substantially transferred.

One advantage to the present invention is the ability to control the rotation of the pivot arms to allow adjustment to any structural restrictions, such as rolls or struts, crossing the path of the pivot arms. When either pivot arm can move through the bale chamber, it can assist the bale movement during unloading or at least avoid, that the bale rolls back. In order to provide for stability in the bale control means, i.e. to assure that both pivot arms do not move in an unwanted way when certain baling conditions appear or to keep the whole tensioning system in a certain position when springs or other forces apply, it is helpful to use another actuator to control the entire tensioning system.

By attaching three or more mobile rolls on the pivot arms enables additional loops to be created which will ultimately control the size of the bale chamber is dictated by the change in length of the bailing means. When the second pivot arm is provided with mobile rolls at its ends, the baling means strands running over rolls at the ends will neither be not damaged or subject to any frictional forces.

A second pivot arm having legs being located outside the bale chamber may pivot in a bigger region, since no fixed rolls or mobile rolls in the bale chamber will cross their path. In this configuration, the actuator is arranged such, that it is not fully retracted when the bale formation process starts and permits the actuator to release the baling means length in a first movement and may take slack out of the baling means in a second movement.

BRIEF DESCRIPTION OF THE DRAWINGS

The invention can be better understood with reference to the following drawings and description. The components in the figures are not necessarily to scale, the emphasis instead being placed upon illustrating the principles of the invention. Furthermore, in the figures, reference numerical design corresponding parts are maintained throughout the different views.

DETAILED DESCRIPTION OF THE DRAWINGS AND THE PRESENTLY PREFERRED EMBODIMENTS

Figure 1:
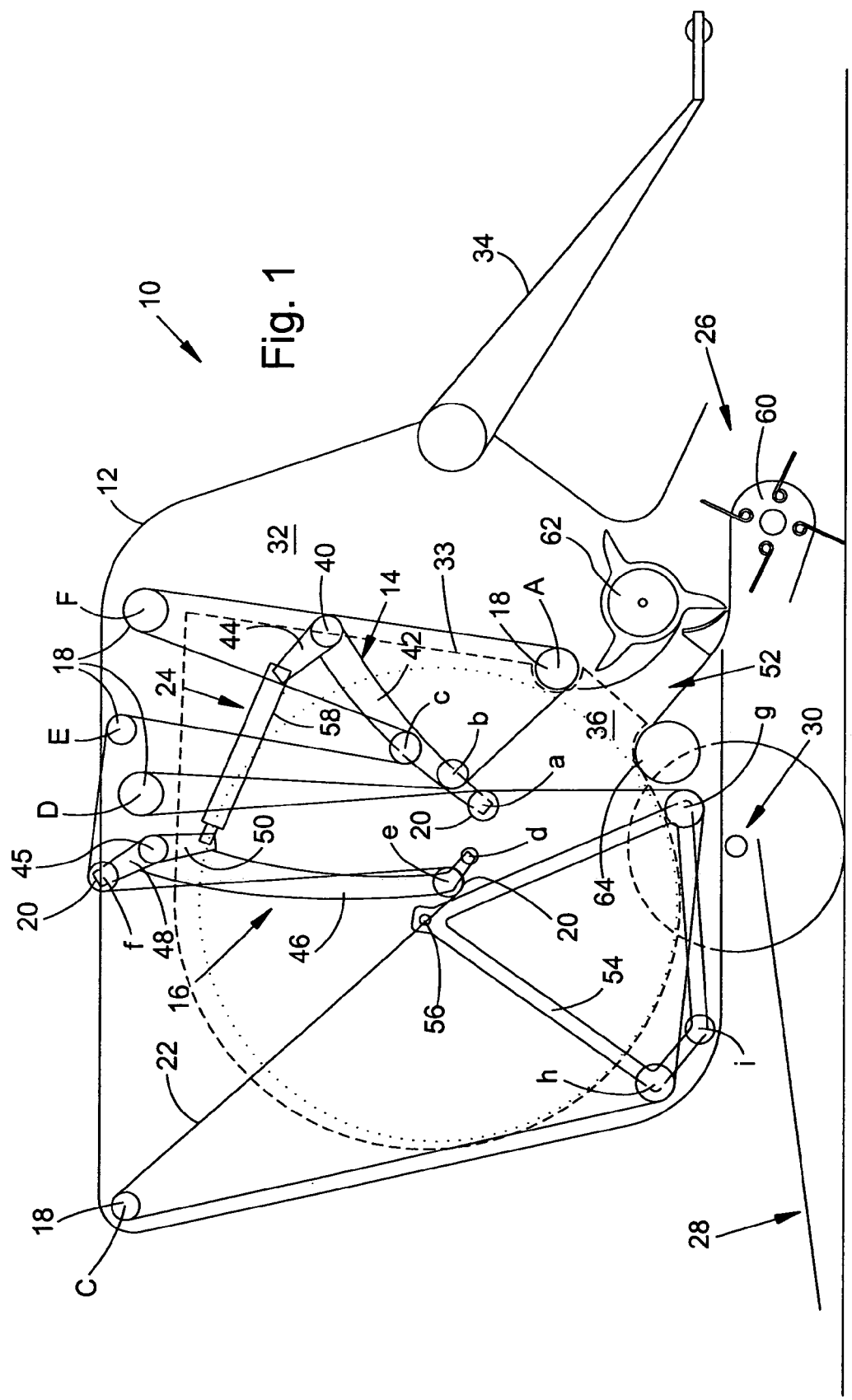
FIG. 1 shows a side schematic view of a first embodiment of the round baler according to the present invention having two pivot arms controlled by a single actuator in an empty stage.

FIG. 1 shows a round baler 10 having a chassis 12, a first pivot arm 14, a second pivot arm 16, fixed rolls 18, mobile rolls 20, baling means 22, a baling means control 24, a feeding mechanism 26 and an unloading mechanism 28. In this configuration, the baler 10 has a variable chamber and can be pulled behind a tractor over a field to pick-up crop forming round cylindrical bales. The baler 10 may comprise a twine, net or plastic wrapping system. Furthermore the round baler 10 may be part of a self-propelled vehicle or be of the pull type.

The chassis 12 has a wheeled axle 30, a pair of outer side structures or walls 32 to which a pair of inner side walls 33 are attached, and a tongue 34. The wheeled axle 30 may be formed from a single rigid axle type, as shown, or using a tandem axle with or without spring suspension. Each side structure 32 is oriented vertically, carried by the wheeled axle 30 and forms the round baler 10 with the pair of inner side walls 33 spaced laterally from each other and respectively from the pair of outer side structures 32. The side structures 32 and the inner side walls 33 are disclosed in more detail in reference EP 1 264 531, incorporated herein.

In this configuration, the side structures 32 are not split in the area of a bale chamber 36 formed between them. The side structures 32 are stationary when the formed bale 38 is ejected. In general, the inner side walls 33 can be an integral part of the side structures as shown using dashed lines in the figures. The walls 33 are attached to the side structures 32 and serve to define laterally spaced ends of the bale chamber 36. The walls 32 and 33 are not split in halves and do not or hardly extend beyond the silhouette of a completed bale 38.

If desired, the pair of inner walls 33 may be mounted in a manner in which they are not stationary but are mounted such that they may be adjusted laterally relative to the side structures 32. When the walls 33 are so mounted, the pivot arms 14 and 16 and the fixed rolls 18 are mounted to other parts of the side structures 32. The tongue 34 is fixed to the side structures 32 to connect the baler 10 to the tractor (not shown).

The first pivot arm 14 is located between the side structures 32 and assumes substantially the form an "U" shape. The base of the "U" of the first pivot arm 14 is journalled on an axis 40 oriented horizontally and transverse to the travel direction of the baler 10. The first pivot arm 14 can be fixed with respect to the side structures 32. The axis 40 is located approximately one third of the side structure 32 length from the front and one third of the side wall or side structure 32 height from the top. Legs 42 of the "U" of the first pivot arm 14 extend parallel to the side structure 32 or its side walls and are pivotable in a vertical direction between a 7:00 o'clock (bale start position) and 11:00 o'clock (full bale position) pointer position. The length of the legs 42 reaches almost half of the height of the side structure 32. Rigidly connected to the legs 42 or to the base of the "U" is at least one lever arm 44.

The second pivot arm 16 is of similar "U" construction as the first pivot arm 14, whereas an axis 45 for the base of the "U" is located close to the upper edge of the side structures 32 at about the half of their length. Legs 46 of the "U" of the second pivot arm 16 extend as well parallel to the side structures 32 and are pivotable in a vertical direction between a 6:00 o'clock (bale start position) and an 8:00 o'clock (full bale position) pointer position, when viewed from the right hand side. The legs 46 are slightly longer than the legs 42. Finally at one side of the second pivot arm 16 a lever arm 48 is connected to receive a mobile roll 20 as described later, and to the other side at least one lever arm 50 is attached for the baling control means 24, also described later. Both lever arms 48, 50 and the legs 46 form substantially a "T" form.

Fixed rolls 18 have end portions being rotatably journalled in, on or at the side structures 32, whereas they all run parallel to each other and parallel to the ground on which the round baler 10 stands. Depending on the chosen embodiment more or less fixed rolls 18 may be present, whereas most of them are of the same design. The roll body can be journalled on a shaft or stub shaft or a roll body with fixed stub shafts rotatably received in bearings (not shown) in side structures 32. However, the diameter of the rolls 18 may vary. It is obvious that "fixed" means, that their position is fixed, whereas the rolls 18 as such can rotate.

For the sake of the ongoing description the fixed rolls 18 are designated by capital letters A through F, whereas: A refers to a fixed roll 18 slightly above an inlet 52 to the bale chamber 36 and above and close to the feeding mechanism 26; C refers to a fixed roll 18 in the upper rear corner area of round baler 10; D refers to a fixed roll 18 close to the upper edge of the side structures 32 and at about the half of their length; E refers to a fixed roll 18 also close to the upper edge of the side structure 32, but between the upper front corner area of the round baler 10 and the fixed roll 18 referenced by D, and F refers to a fixed roll 18 in the upper front corner area of the round baler 10. At least one of the rigid rolls 18 is driven and formed such that it may transfer movement energy from the driven roll 18 to the baling means 22. Some of the rolls 18 may have guide means for the baling means 22. The position of the mobile rolls 20 may vary during the baling process, run parallel to the fixed rolls 18 and are of comparable design.

The mobile rolls 20 are designated by small letters a through i, whereas: a) refers to a mobile roll 20 in the end region (remote from the axis 40) of the legs 42 of the first pivot arm 14; b) refers to a mobile roll 20 close to the end region (remote from the axis 40) of the legs 42 of the first pivot arm 14; c) refers to a mobile roll 20 at about the half of the length of the legs 42 of the first pivot arm 14; d) refers to a mobile roll 20 in the end region (remote from the axis 45) of the legs 46 of the second pivot arm 16; e) refers to a mobile roll 20 close to the end region (remote from the axis 45) of the legs 46 of the second pivot arm 16; f) refers to a mobile roll 20 between the free end portions of lever arms 48 of the second pivot arm 16; g) refers to a mobile roll 20 located in a lower front corner area (as seen in FIG. 1) of an unloading pivot frame 54; h) refers to a mobile roll 20 located in a lower rear (as seen in FIG. 1) corner area of the unloading pivot frame 54 and i) refers to a mobile roll 20 located between the rolls g and h, but close to h and slightly below a line through rolls g and h of the unloading pivot frame 54.

The unloading pivot frame 54 has substantially the form of a triangle, an upper corner (as seen in FIG. 1) of which is journalled about an axis 56, parallel to the axes 40, 45 and located very close to mobile roll 20, ref. e, when the second pivot arm 16 assumes its position, when bale forming starts. The rear lower corner are of the unloading pivot frame 54 finds itself in the rear lower corner area of the side structure 32 and the front lower corner area of the unloading pivot frame 54 is located immediately behind a lower roll 64, discussed in further detail below, each when viewing FIG. 1.

In one embodiment, the baling means 22 is formed by a set of belts, running parallel to each other in laterally spaced relationship. Instead of, a single endless belt or a chain and slat conveyor could be used to provide for flexibility, allowing movement over the rolls 18 and 20. The routing of the baling means 22 is described in the following with respect to the embodiment and mode of operation shown in FIG. 1. Starting from fixed roll 20 ref. A the route is: F-c-E-f between e and d-e-C—between h and i-g—between a and b-D—between a and b-A-F. During the mode of operation as illustrated in FIG. 1, the baling means 22 is not routed over mobile rolls 20, d and i. Another loop is formed about roll D, whereas its size decreases with the growing bales and is determined by the position of the mobile rolls a and b.

The baling control means 24 is composed of various not shown pump, sump, valves, sensors, lines, a CPU, etc. and for the pivot arms 14, 16 one actuator 58 extending between and pivotally fixed to lever arms 44 of the first pivot arm 14 and lever arms 50 of the second pivot arm 16. The control means 24 receives and computes signals coming from the various round baler components as well as from an operator. The output signals of the CPU controlling the actuator 58 are such, that during bale formation a certain resistance acts onto the pivot arms 14, 16 to provide for a wanted density in the bale 38 and that after unloading the bale 38, the pivot arms 14, 16 return to their initial bale starting position.

The actuator 58 of this embodiment is in the form of a single or double acting linear hydraulic motor; alternatively it could be an electric motor. As shown in FIGS. 1 to 4 actuator 58 is used to control the position of the first and of the second pivot arm 14, 16. This is possible, since the forces applying both pivot arms 14, 16 are quite balanced. Alternatively to the use of an actuator 58 in the form of a hydraulic cylinder attached directly to the pivot arms 14, 16 or their lever arms 44, 50 one could use a hydraulic cylinder for one direction and a spring for a movement in the other direction, one could use a strong spring only, like a coil spring, one could use an electric or pneumatic motor, one could apply the actuator—being in the form of a hydraulic cylinder, of a spring, or of a motor—via a cable or linkage to both pivot arms 14, 16 or directly to one of the pivot arms 14, 16 and via a cable or link to the other pivot arm 16, 14. The unloading pivot frame 54 is raised and if need be lowered by a hydraulic actuator, which is controlled as well by these baling control means to achieve a synchronized movement.

The feeding mechanism 26 is designed in the usual way. The mechanism 26 includes a pick-up 60, downstream thereof a conveyor 62 formed as a cutting unit, a converging auger or other transport mechanism and in the area of the inlet 52 the bottom roll 64, which all together assist in taking crop from the ground and deliver it through the inlet 52 into the bale chamber 36, where it is rolled to a bale 38.

Figure 3:
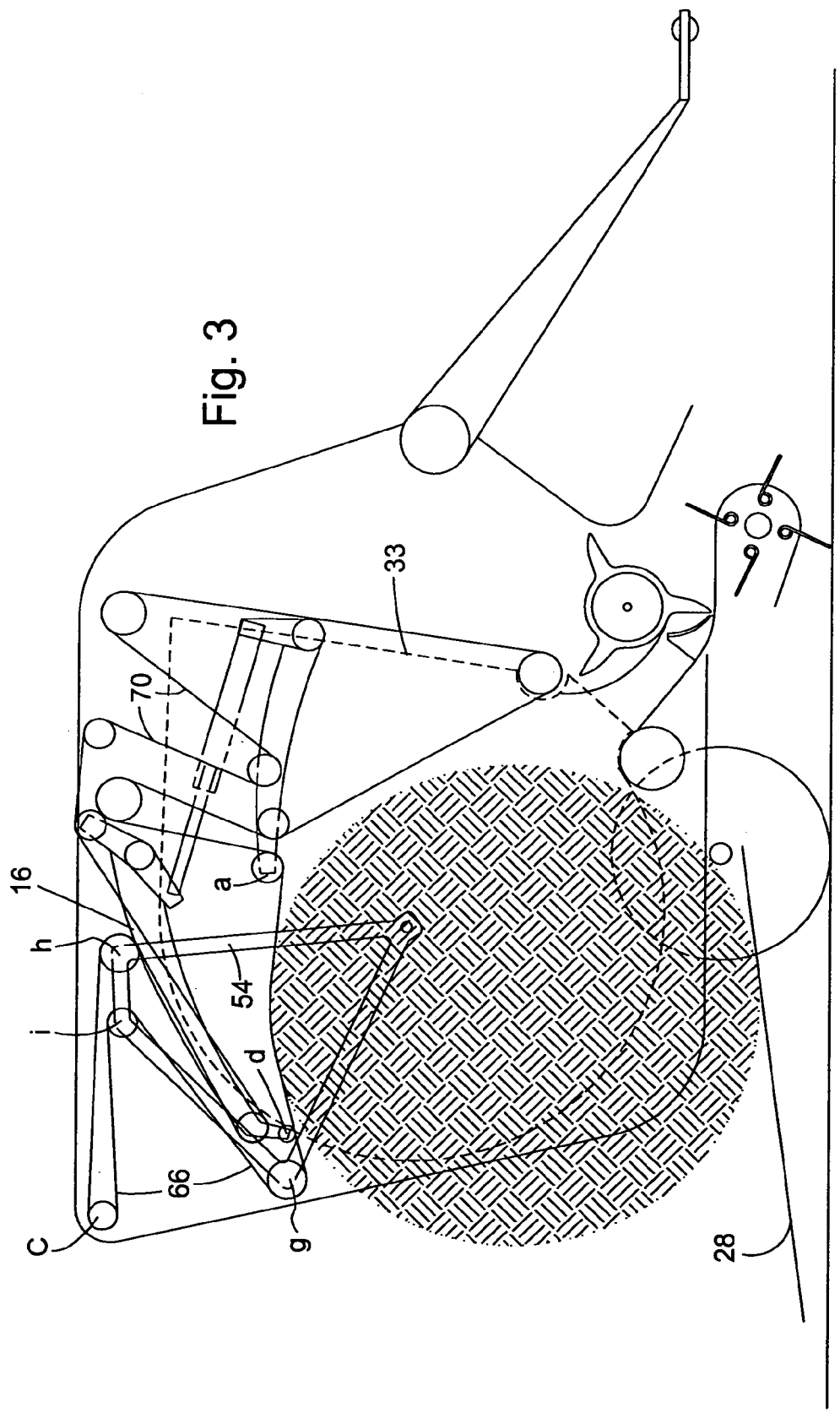
FIG. 3 show the round baled of FIG. 1 with a completed bale during unloading.
Figure 4:
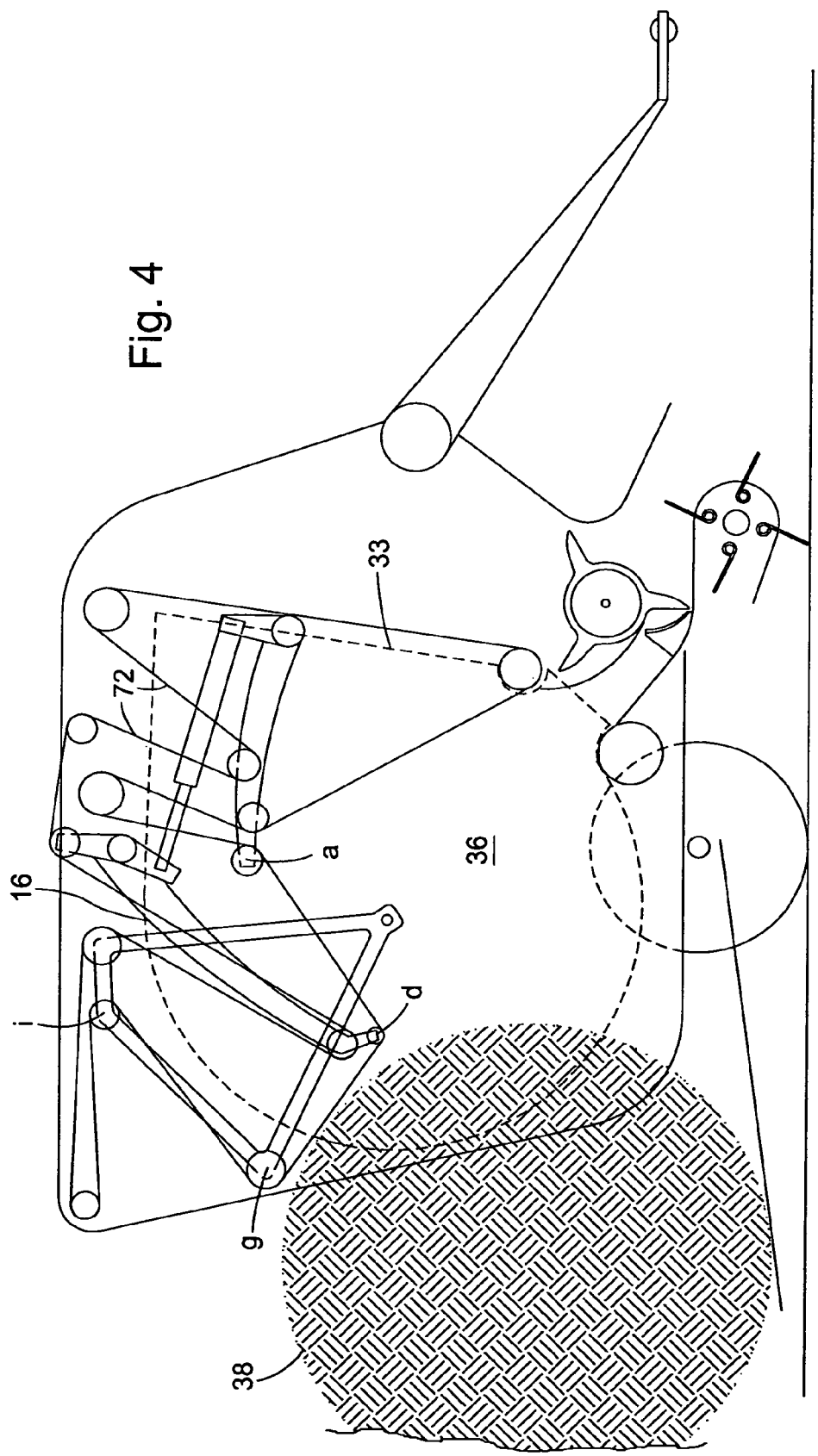
FIG. 4 shows the round baler of FIG. 1 with a completed bale after unloading.

The unloading mechanism 28 as shown in FIG. 3 is formed as a ramp—remote controlled or spring loaded—on which the unloaded bale 38 rolls down onto the ground, as this is known. Having described the structure of the round baler 10 so far, its function is as follows, starting from the situation in FIG. 1.

As illustrated in FIG. 1 spans of the baling means 22 between a and g as well as between b and A form two sides of the bale chamber 36, which is kept minimal, since pivot arm 14 is in its lowest, 7:00 position. Roll g lies adjacent to bottom roll 64, since the unloading pivot frame 54 assumes its lowest position, which brings the span between rolls a and g into a vertical orientation. The actuator 58 assumes its minimal length and both pivot arms 14, 16 assume their lowest location.

Figure 2:
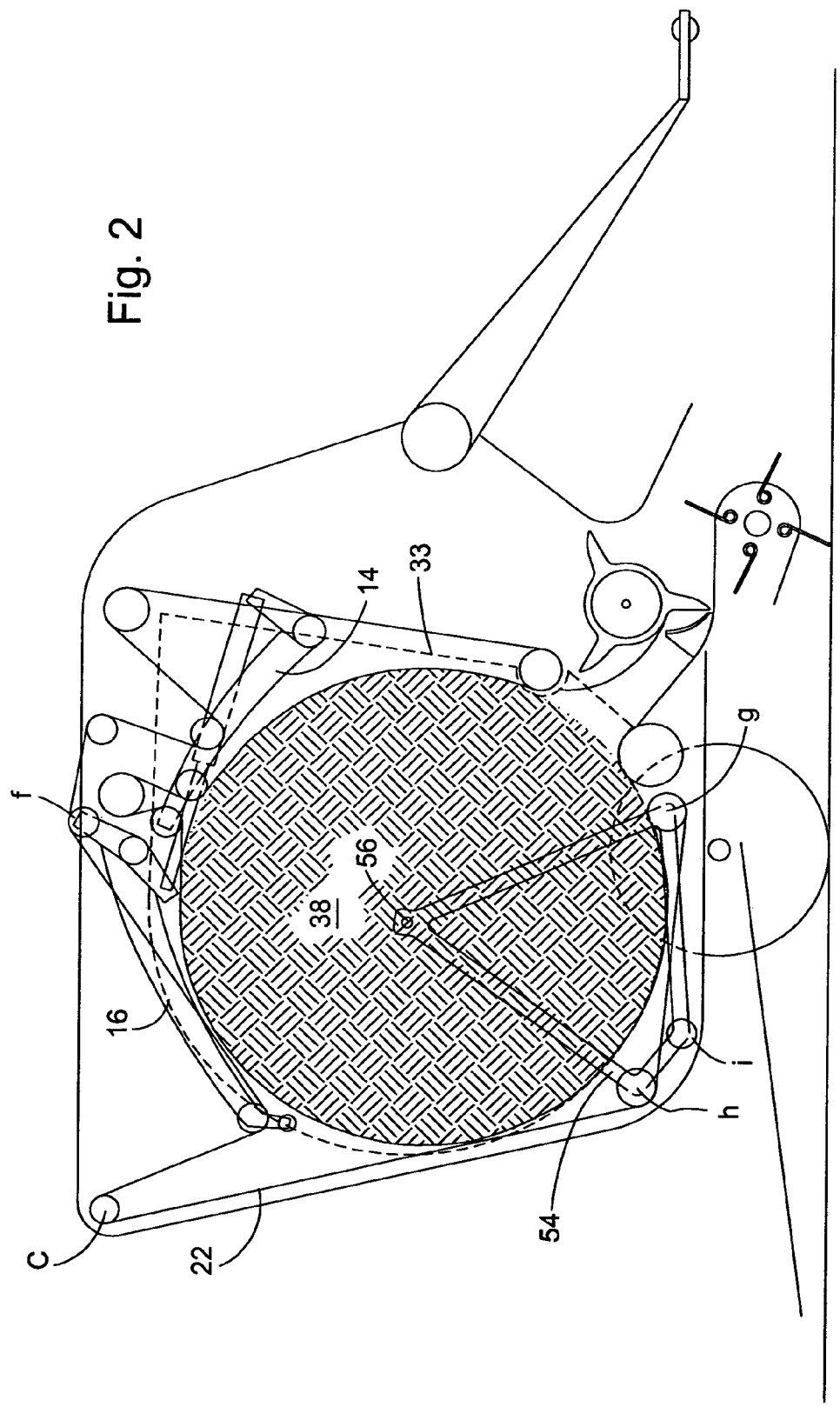
FIG. 2 shows the round baler of FIG. 1 with a completed bale.

When crop is fed continuously through the inlet 52 a bale 38 will start to grow and push first pivot arm 14 upward thereby extracting actuator 58 against a force provided by resistance in the baling control means 24, for example created by a nozzle, a valve or the like. Simultaneously pivot arm 16 will be pulled upwardly by the baling means 22 shortening the span between rolls C and f in order to adjust to the growing circumference of the bale 38. Both pivot arms 14, 16 rotate clockwise, when looking at the drawing. Movement of the pivot arms 14, 16 and thus also of the mobile rolls a–f continues until the bale 38 has reached its desired or maximum size as illustrated in FIG. 2. When the bale chamber 36 is full the pivot arms 14, 16 reached their upper position and follow approximately the circumference of the bale 38. The unloading pivot frame 54 and the rolls g to i are still in their lower position and together with the baling means 22 support the bale 38.

In order to unload the bale 38 the unloading pivot frame 54 is pivoted clockwise about axis 56 into the position shown in FIG. 3, in which a line through the center of rolls g and h shows an inclination to the ground of about 30 degrees and finds itself above the second pivot arm 16. Due to the upward movement also roll i moved upwardly and hit the span between rolls g and C. Roll i creates a loop 66 (as illustrated in FIG. 3) to take out slack in the baling means 22, which appears, as soon as the bale 38 rolls down the unloading mechanism 28. As soon as the bale 38 has left the bale chamber 36, the pivot arms 14, 16 move downward in a counter clockwise direction, whereas the mobile roll d hits the span between rolls g and a. Once the second pivot arm 16 has lowered about halfway, the bale 38 can no longer roll back into the bale chamber 36. Finally the situation shown in FIG. 1 is reached again.

Figure 5:
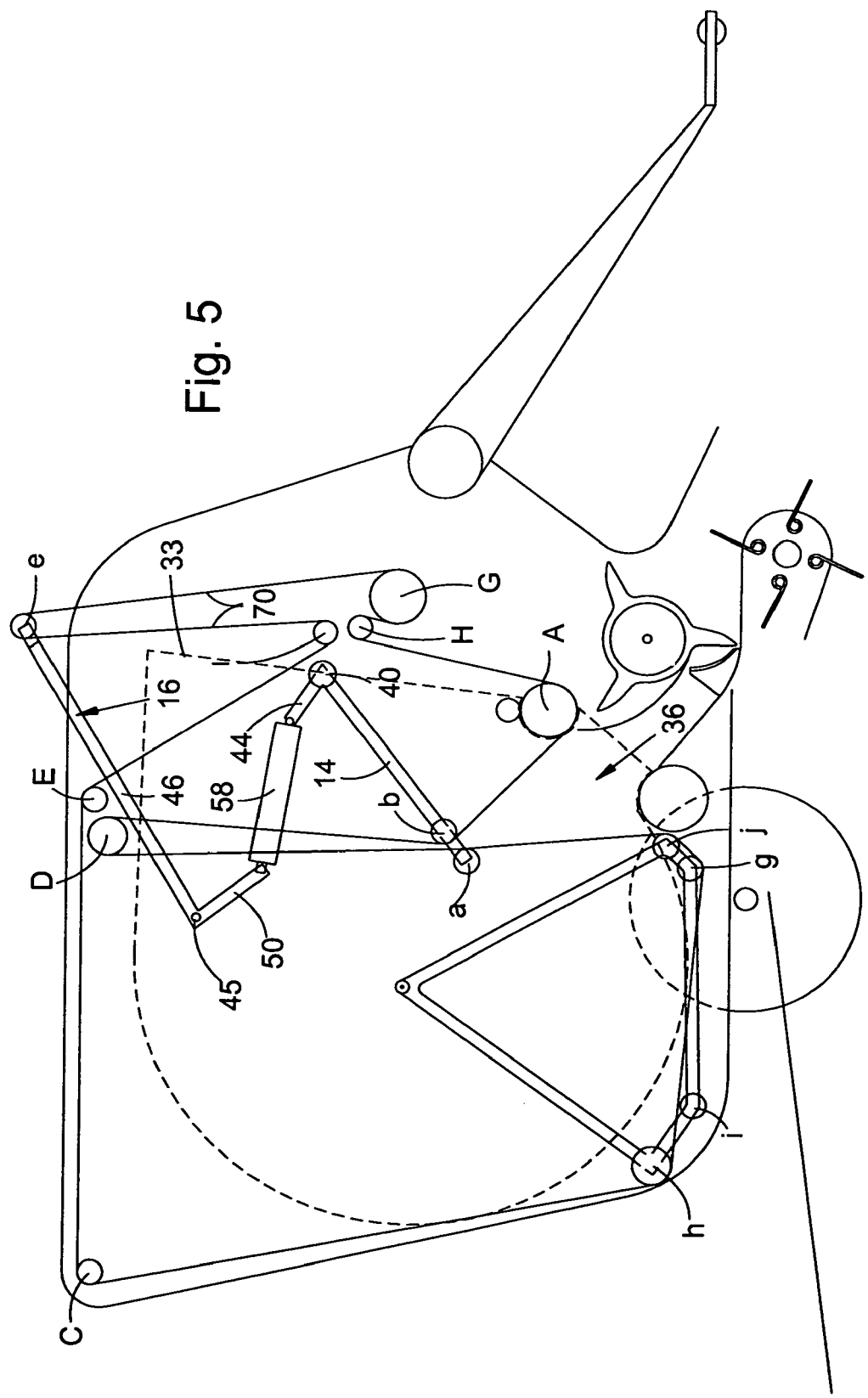
FIG. 5 shows a side schematic view of a second embodiment of the present invention having two pivot arms controlled by a single actuator in an empty stage.
Figure 6:
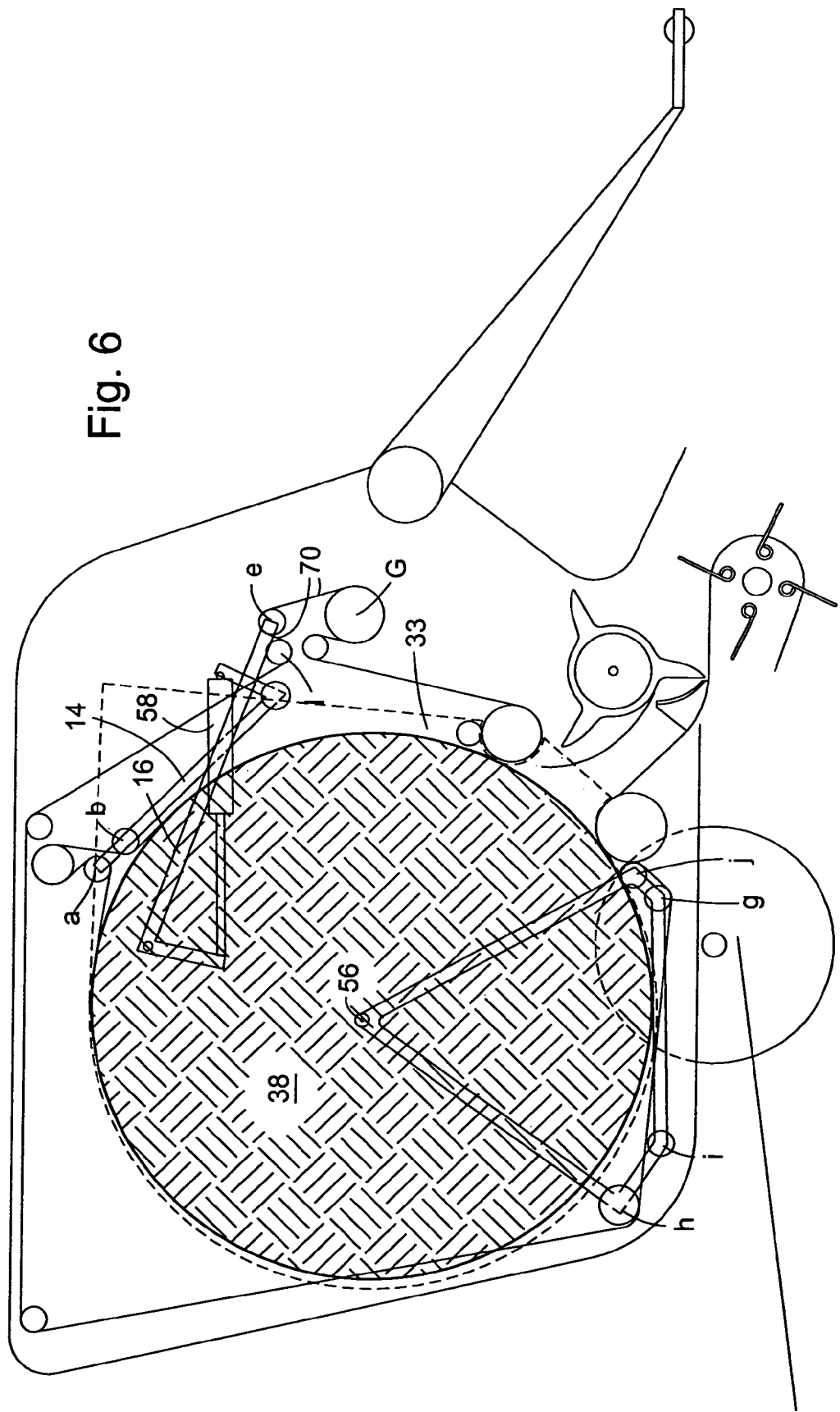
FIG. 6 shows the round baler of FIG. 5 with a completed bale.
Figure 7:
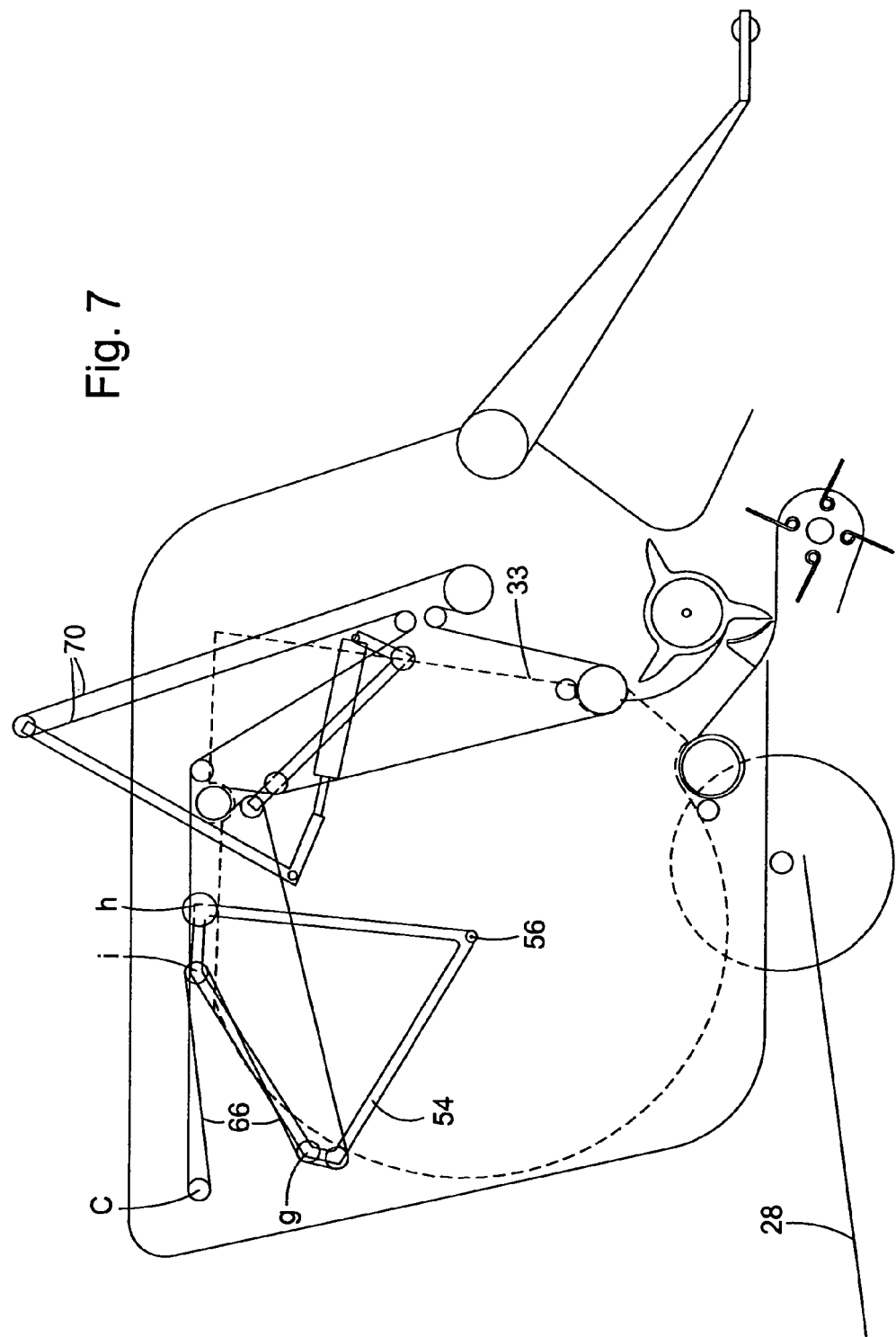
FIG. 7 shows the round baler of FIG. 5 with a completed bale during unloading present invention having two pivot arms controlled by a single actuator in an empty stage.

FIGS. 5–7 illustrate a second embodiment having many components in common with the first embodiment, especially one actuator 58 for two pivot arms. Preferably, the purpose of the round baler 10 and the design of its chassis 12 are the same or equivalent to that of the first embodiment. The first pivot arm 14 has the same design and is located and journalled in a similar or identical way. In particular it has lever arms 44, to which actuator 58 may be connected.

The second pivot arm 16, however, is different from the one of the first embodiment in many respects. The second pivot arm 16 of the second embodiment is journalled on axis 45, which is located at about half way of the length of round baler 10 close to the roll D in the upper region. The legs 46 extend outside the bale chamber 36; face the outer surfaces of the side walls and terminate approximately at the front upper corner of the round baler 10. At the end region close to the axis 45 lever arms 50 are fixed to the legs 46 and extend substantially perpendicular therefrom. At the end remote from axis 45 the legs 46 are connected by the base of the "U". The legs 46 may pivot in a range between a 1:00 and a 4:00 o'clock pointer position.

During operation both pivot arms 14, 16, rotate in the same direction, i.e. clockwise viewing the drawing when the bale 38 is growing. Fixed rolls 18 A, C, D and E are in the same position as those of the first embodiment. In this embodiment, fixed rolls G, H and I are provided which are located at different places. Roll G is located close to a place where the tongue 34 meets the side structure 32 half way of the height of the side structure 32 and close to their front edge. Rolls H and I are arranged very close to each other and nearby the axis 40 about which the first pivot arm 14 swings. Both rolls H and I are located above and rearward of roll G.

In this embodiment, the mobile rolls 20 are different in so far, as only rolls a and b are provided on first pivot arm 14. A third roll c is missing on said pivot arm 14. Second pivot arm 16 bears only mobile roll e at the end of it remote from axis 45, whereas roll d is missing. Rolls g, h, and i are present on the unloading pivot frame 54 and in addition a mobile roll j is installed very close to, above and forward of roll g. This mobile roll j is not needed if a mobile roll g which has a larger diameter.

The baling means 22, the baling control means 24, the feeding mechanism 26, the unloading mechanism 28, the unloading pivot frame 54 and the bottom roll 64 are similar or identical to those of the first embodiment. All in all and starting again from fixed roll A the routing of the baling means 22 is: H—between H and G-G-e—between I and H-I-E-C—between h and i-g-j—between a and b-D between a and b-A. In this routing another loop 70 is formed by means of the strand between rolls I and G, as the baling means 22 is routed over roll e. This loop 70 is used instead of a loop 70 about roll c in the first embodiment.

Bale formation starts when the round baler 10 assumes the position as shown in FIG. 5. In this position the first pivot arm 14 assumes its lowest position, the second pivot arm 16 assumes a center position close to the front upper corner of the round baler 10 and the unloading pivot frame 54 is in its lowest position. The actuator 58 is shortened to its maximum. The bale chamber 36 has the smallest dimension and is substantially of triangular shape.

When crop is fed continuously through the inlet 52 a bale 38 will start to grow and push pivot arm 14 upward thereby extracting actuator 58 against a force provided by resistance in the baling control means 24 created by a nozzle, a valve or the like. Simultaneously pivot arm 16 will be pulled downwardly by the baling means 22 shortening the span between rolls G and I, and loop 70 in order to adjust to the growing circumference of the bale 38. Both pivot arms 14, 16 rotate clockwise. Movement of the pivot arms 14, 16 and thus also of the mobile rolls a, b and e continuous until the bale 38 has reached its desired or maximum size, as illustrated in FIG. 6—see FIG. 6. When the bale chamber 36 is full the pivot arm 14 reached its highest and the pivot arm 16 reached its lowest position, in which the first pivot arm 14 follows approximately the circumference of the bale 38. Accordingly the actuator 58 has been extracted to its maximum length. The unloading pivot frame 54 and the rolls g to j are still in their lower position and together with the baling means 22 support the bale 38. Since the second pivot arm 16 moves towards fixed roll G, the loop 70 shortens close to non-existence.

In order to unload the bale 38, the unloading pivot frame 54 is pivoted clockwise about axis 56 into the position shown in FIG. 7 in which a line through the center of rolls g and h shows an inclination to the ground of about 30 degrees. Due to the upward movement also roll i moved upwardly and hit the span between rolls g and C. Roll i creates a loop 66 as shown in FIG. 7 to take out slack in the baling means 22, which appears, as soon as the bale 38 rolls down the unloading mechanism 28. As soon as the bale 38 has left the bale chamber 36, the second pivot arm 16 moves upward in a counter clockwise direction, thereby enlarging the loop 70 to the biggest possible extent. Afterwards both pivot arms 14, 16 moves down and finally the situation shown in FIG. 5 is reached again.

Figure 8:
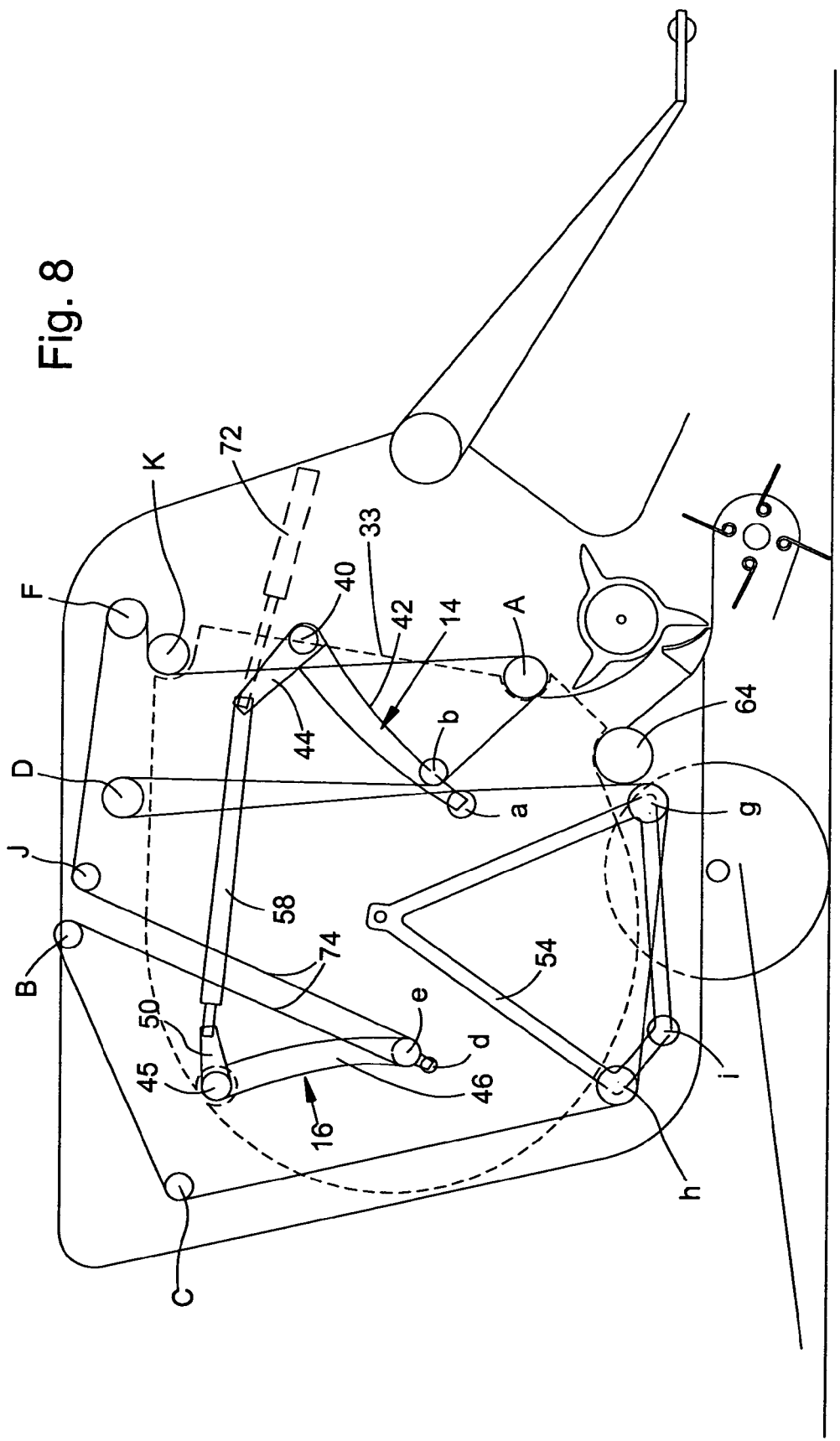
FIG. 8 shows a side schematic view of a third embodiment of the present invention having two pivot arms controlled by a single actuator in an empty stage.
Figure 9:
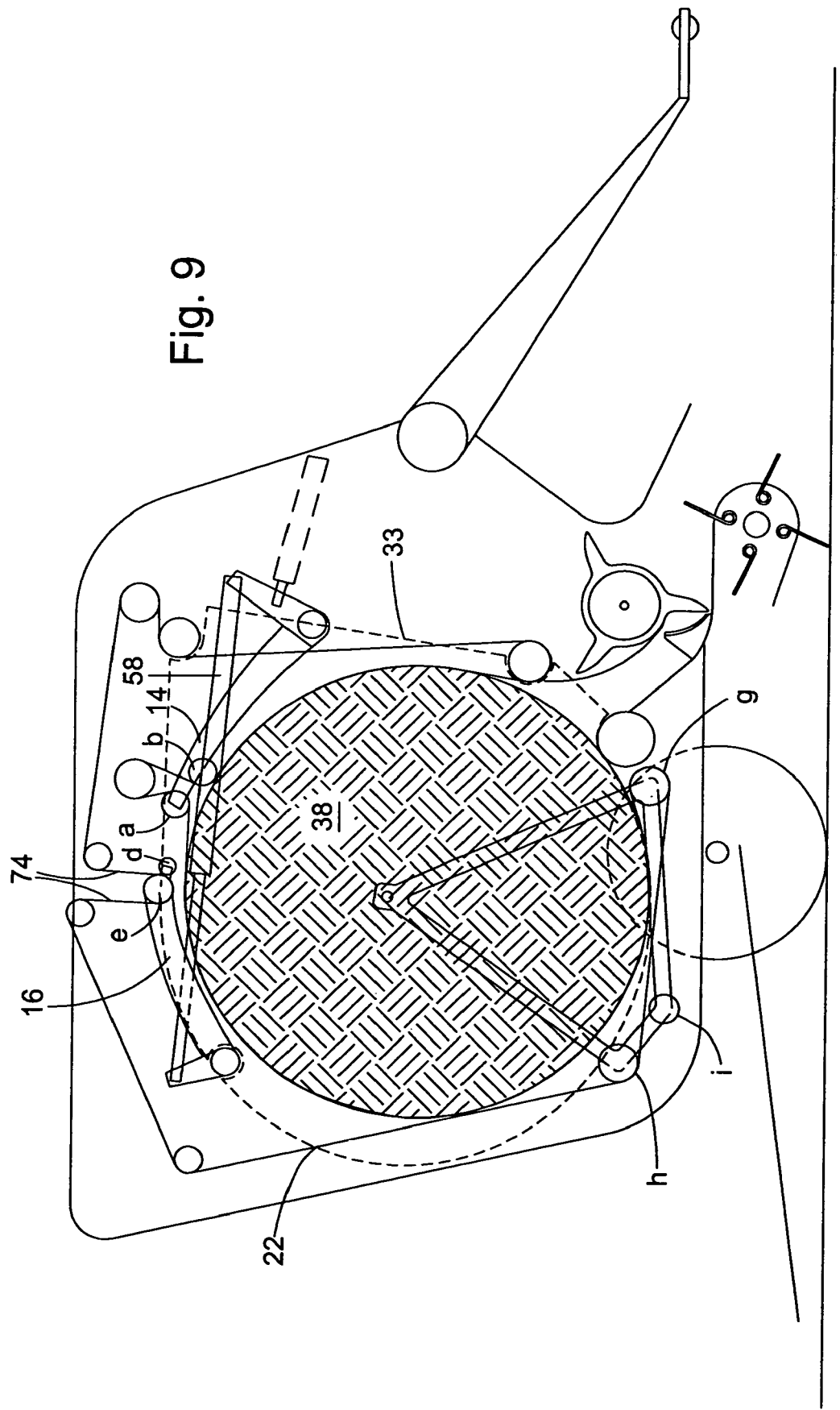
FIG. 9 shows the round baler of FIG. 8 with a completed bale.
Figure 10:
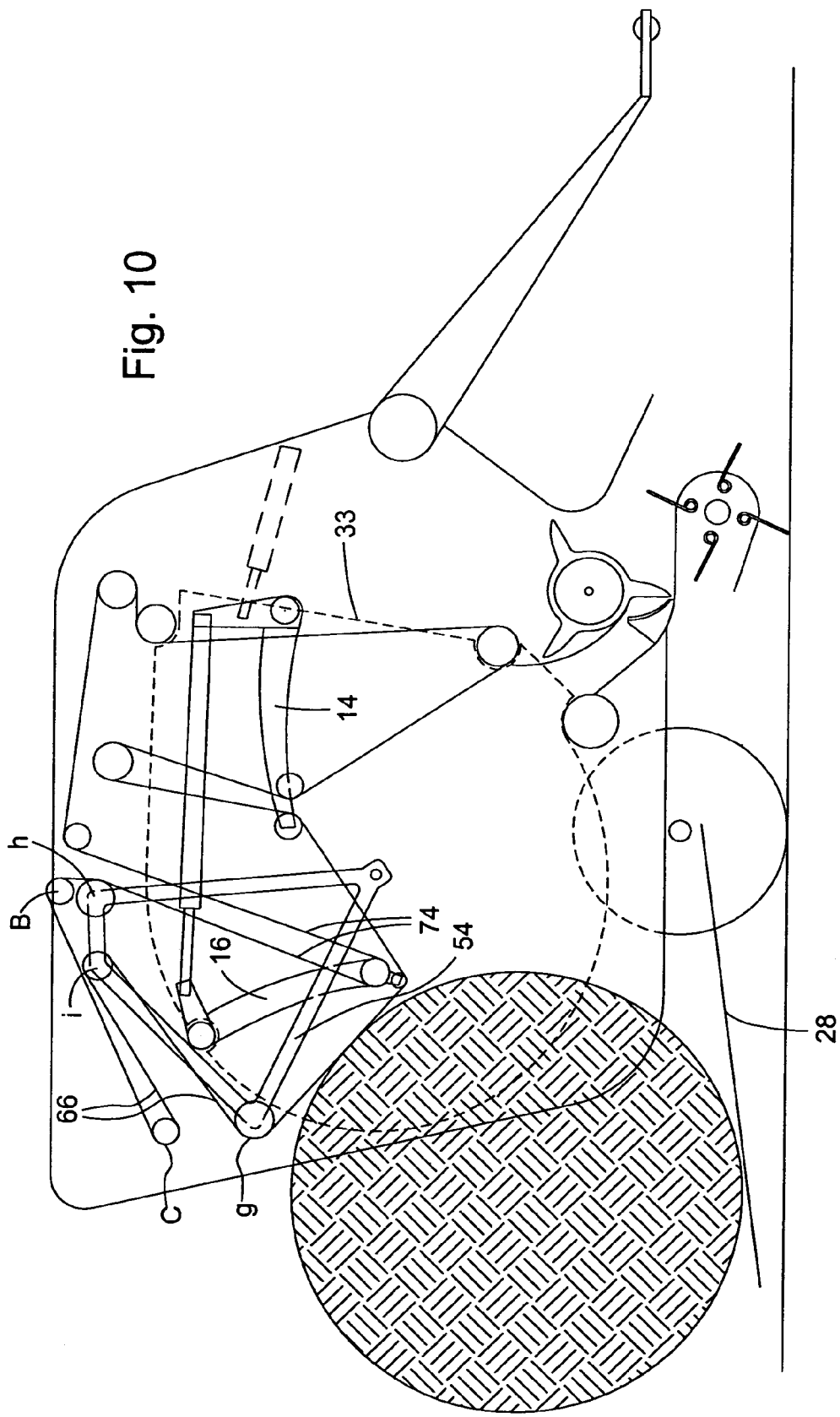
FIG. 10 shows the round baler of FIG. 8 with a completed bale during unloading.

FIGS. 8–10 illustrate a third embodiment in accordance with the present invention having many components in common with the first and second embodiment, specifically; one actuator 58 is used in conjunction with two pivot arms 14, 16. The purpose of the baler 10 and the design of its chassis 12 are the same or equivalent to that of the first and second embodiments. The first pivot arm 14 has the same design and is located and journalled in a similar or identical way. In particular it has lever arms 44, to which actuator 58 may be connected.

The second pivot arm 16 is different from the one of the first and second embodiments in some respects. The second pivot arm 16 of the third embodiment is journalled on axis 45, which is located in the wider area of the rear upper corner of the side structure 32 and close to the roll C. The legs 46 extend inside the bale chamber 36, when filled, and terminate slightly below the middle of the height of the side structure 32. When the bale chamber 36 is empty, as this is shown in FIG. 8, the legs 46 run substantially vertical, whereas the axis 45 is situated on top of the legs 46. At the end region close to the axis 45 lever arms 50 are fixed to the legs 46 and extend substantially perpendicular therefrom. At axis 45 the legs 46 are connected by the base of the "U". The legs 46 may pivot in a range between a 6:00 o'clock and a 2:00 o'clock pointer position.

During operation both pivot arms 14, 16, rotate in contrary direction, as viewed first pivot arm 14 clockwise and second pivot arm 16 counter clockwise, each when the bale 38 is growing. Fixed rolls 18 A, C, D and F are in the same or substantially the same position as those of the first embodiment. However fixed rolls B, J and K are provided, which are located at different places. Rolls B and J are arranged very close to each other and between fixed rolls C and D, however slightly above a line extending through the centers of the rolls C and D and thus close to the upper edge of the side structure 32. Roll K is located very close to roll F, but offset to the rear and below of it. This roll K is provided to increase the amount of wrap around the drive roll F and to move the respective strand of the baling means 22 out of contact with the first pivot arm 14 between its legs 42.

Mobile rolls 20 are different in so far, as only rolls a and b are provided on first pivot arm 14; a third roll c is missing on said pivot arm 14. Second pivot arm 16 bears again two mobile rolls d and e at the end of it remote from axis 45. Rolls g, h, and i are present on the unloading pivot frame 54, not mobile roll f of the first embodiment and not roll j of the second embodiment.

The baling means 22 is equivalent to the one in the first embodiment. The baling control means 24 contains again one actuator 58 between the lever arms 44 and 50, whereas said actuator 58 is joined to these lever arms 44, 50 above the axes 40, 45, when the round baler 10 assumes the position shown in FIG. 8, when the bale chamber 36 is empty. In addition to the baling control means 24 of the former embodiments a second actuator 72 is possibly provided, which at one end is fixed to the chassis 12 or the side structures 32 and which at its other end is connected to the arm 44, where the first actuator 58 applies to it. It should be understood for this as well as for the other embodiments, that one actuator 58 is meant at least one, whereas one may be provided on each side of the round baler 10. The same is true for the second actuator 72. While the first actuator 58 is used to control the relative movement between the two pivot arms 14, 16 as in the first and the second embodiment, the second actuator 72 can be used to control their positions particularly to synchronize displacement of pivot arm 16 in relation to the bale position during its ejection and to take advantage of the pivot arm 16 position to positively push the bale 38 out.

The feeding mechanism 26, the unloading mechanism 28, the unloading pivot frame 54 and the bottom roll 64 are similar or identical to those of the first and the second embodiment. All in all and starting again from fixed roll A the routing of the baling means 22 is: K—between K and F-F-J—between e and d—e-B-C-h—between h and i-g between a and b-D—between a and b-A. In this routing another loop 74 is formed by means of the strand between rolls B and J, as the baling means 22 is routed over roll e. This loop 74 is used instead of a loop 70 about roll c in the first embodiment or about roll e of the second embodiment.

Bale formation starts when the round baler 10 assumes the position as shown in FIG. 8. In this position the first and second pivot arms 14, 16 assume their lowest position and the unloading pivot frame 54 is in its lowest position. The first actuator 58 is shortened to its maximum. The bale chamber 36 has the smallest dimension and is substantially of triangular shape. When crop is fed continuously through the inlet 52, a bale 38 will start to grow and push pivot arm 14 clockwise upwardly as viewed thereby extracting actuator 58 against a force provided by resistance in the baling control means 24, for example created by a nozzle, a valve or the like. Simultaneously pivot arm 16 will be pulled upwardly by the baling means 22, however counterclockwise, thereby shortening the loop 74 in order to adjust to the growing circumference of the bale 38. Movement of the pivot arms 14, 16 and thus also of the mobile rolls a, b, d and e continues until the bale 38 has reached its desired or maximum size, as shown in FIG. 9.

When the bale chamber 36 is full both pivot arms 14, 16 reached their highest position, in which their longitudinal axes extend like a roof and under angles of about 20 degrees, both follow approximately the circumference of the bale 38. Accordingly the actuator 58 has been extracted to its maximum length. The unloading pivot frame 54 and the rolls g to i are still in their lower position and together with the baling means 22 support the bale 38. The second actuator 72 is shortened to a minimum.

In order to unload the bale 38 the unloading pivot frame 54 is pivoted clockwise about axis 56 into the position shown in FIG. 10, in which a line through the center of rolls g and h shows an inclination to the ground of about 30 degrees. Due to the upward movement also roll i moved upwardly and hit the span between rolls g and C. Roll i creates a loop 66, as shown in FIG. 10, to take out slack in the baling means 22, which appears, as soon as the bale 38 rolls down the unloading mechanism 28. As soon as the bale 38 has left the bale chamber 36, the second pivot arm 16 moves downward in a clockwise direction, thereby enlarging the loop 74 to the biggest possible extent and driving the bale 38 out. In this situation mobile roll d avoids that the baling means 22 gets in contact with each other. Afterwards or simultaneously actuator 72 extends again, first pivot arm 14 moves down and finally the situation shown in FIG. 8 is reached again.

Figure 11:
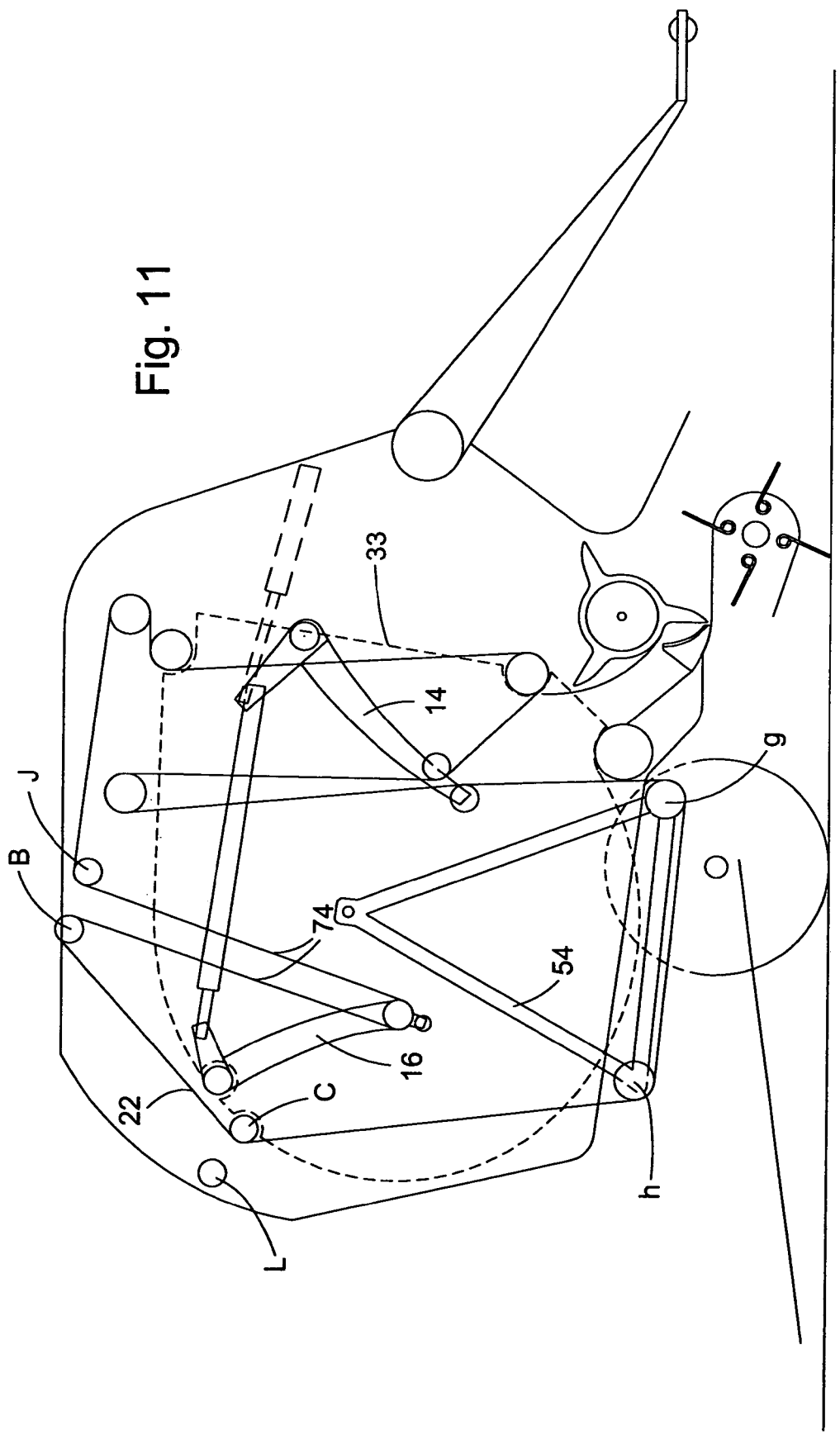
FIG. 11 shows a side schematic view of a fourth embodiment of the present invention having two pivot arms controlled by a single actuator in an empty stage.
Figure 12:
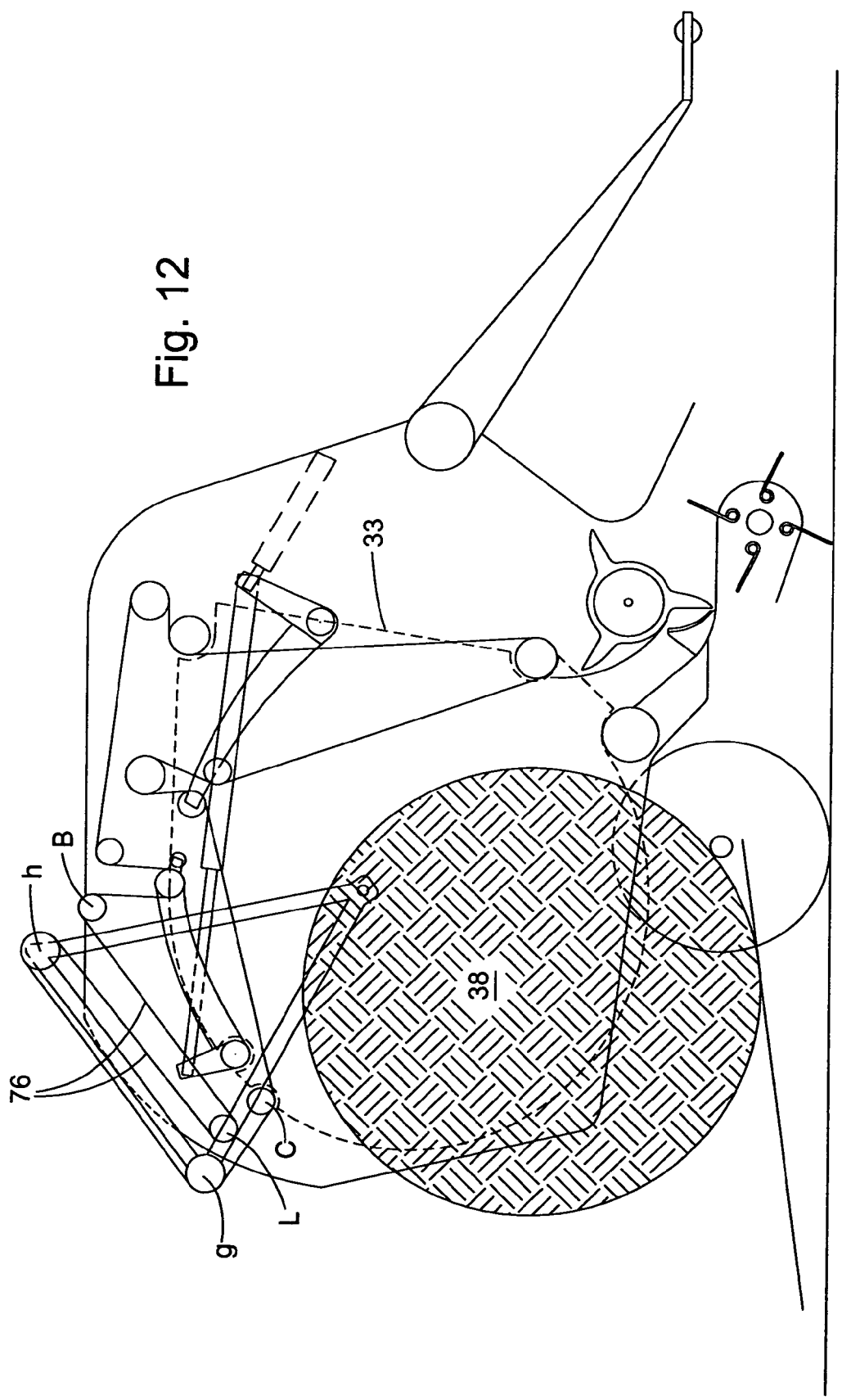
FIG. 12 shows the round baler of FIG. 11 with a completed bale during unloading.

FIGS. 11 and 12 illustrate a fourth embodiment in accordance with the present invention wherein this embodiment differs from the third embodiment insofar, as the unloading pivot frame 54 has mobile rolls h and g only and as a fixed roll L is added very close to, but slightly above and rearward of, fixed roll C, whereas the baling means 22 is routed through the gap between the fixed rolls L and C. The remaining components of the baler 10 including the routing of the baling means 22 and the use of a first and a second actuator 48 and 72 are identical to the third embodiment.

The function during forming a bale 38 is identical to the function in the round baler 10 of the third embodiment. When a finished bale 38 is unloaded and the unloading pivot frame 54 is raised, a loop 76 is formed in the strand between the rolls h and B when said strand hits the fixed roll L. This loop 76 is created to take out slack in the baling means 22, which appears, as soon as the bale 38 rolls down the unloading mechanism 28. In FIG. 10, loop 76 is used instead of loop 66.

Figure 13:
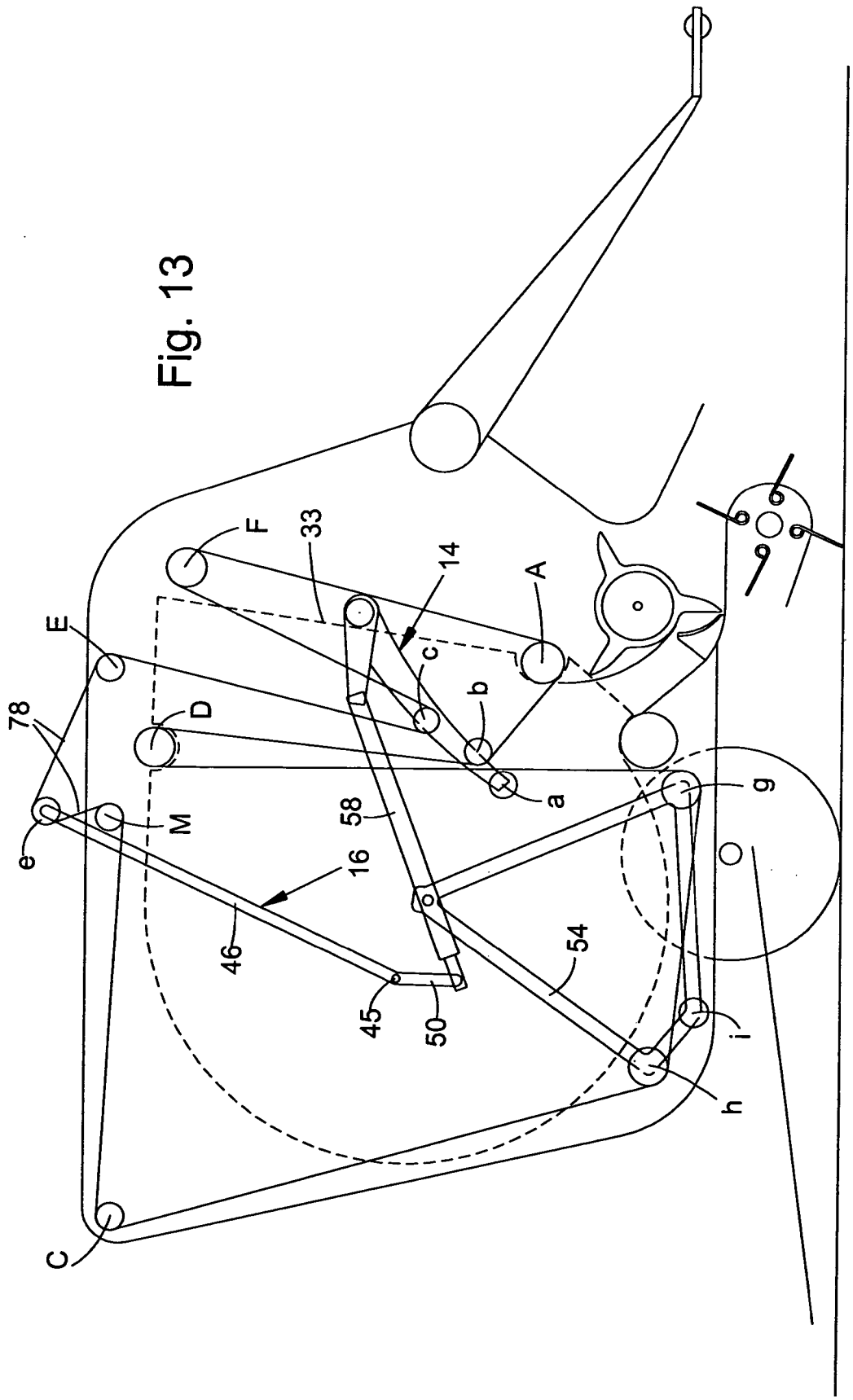
FIG. 13 shows a side schematic view of a fifth embodiment of the present invention having two pivot arms controlled by a single actuator in an empty stage.
Figure 14:
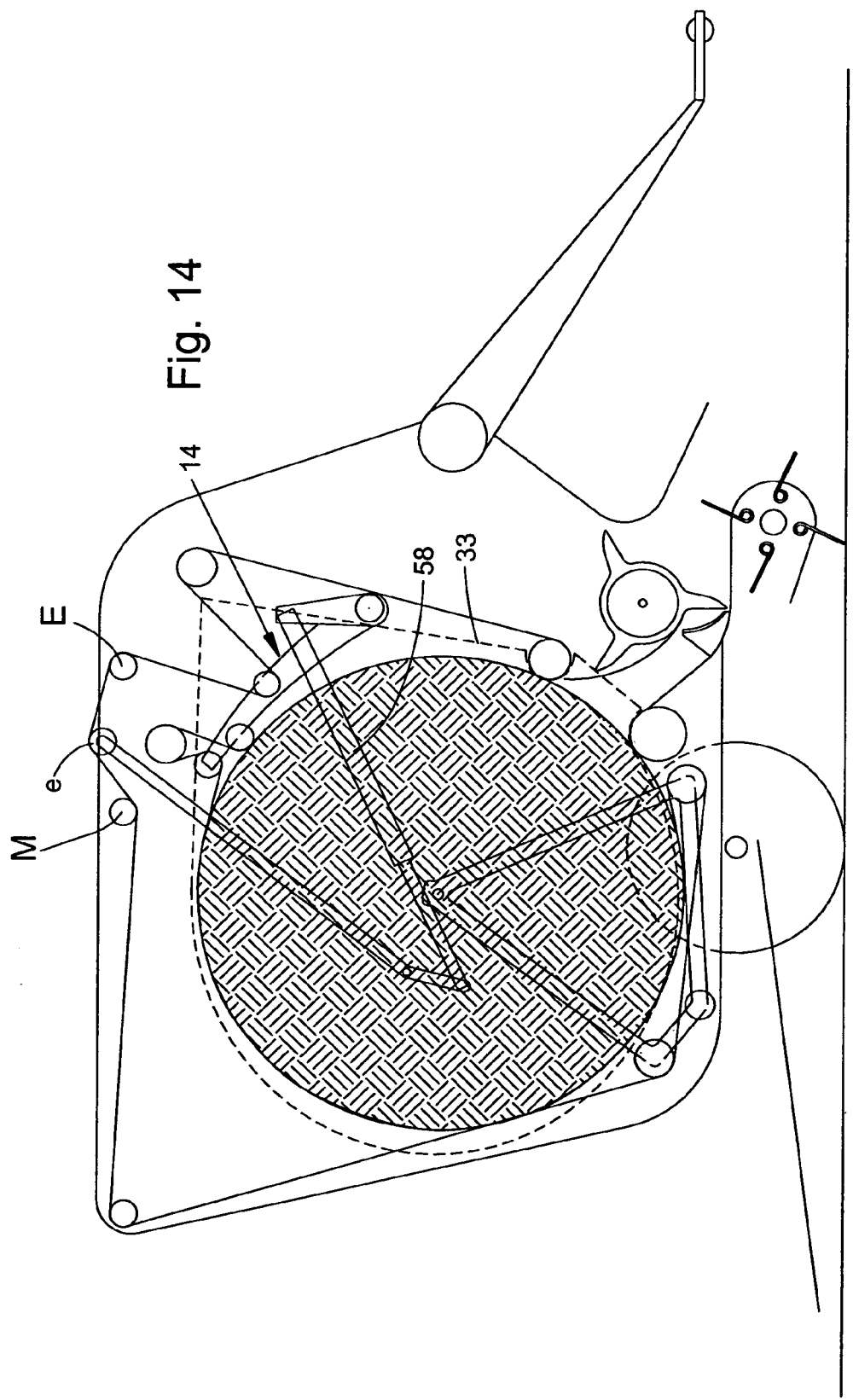
FIG. 14 shows the round baler of FIG. 13 with a completed bale.
Figure 15:
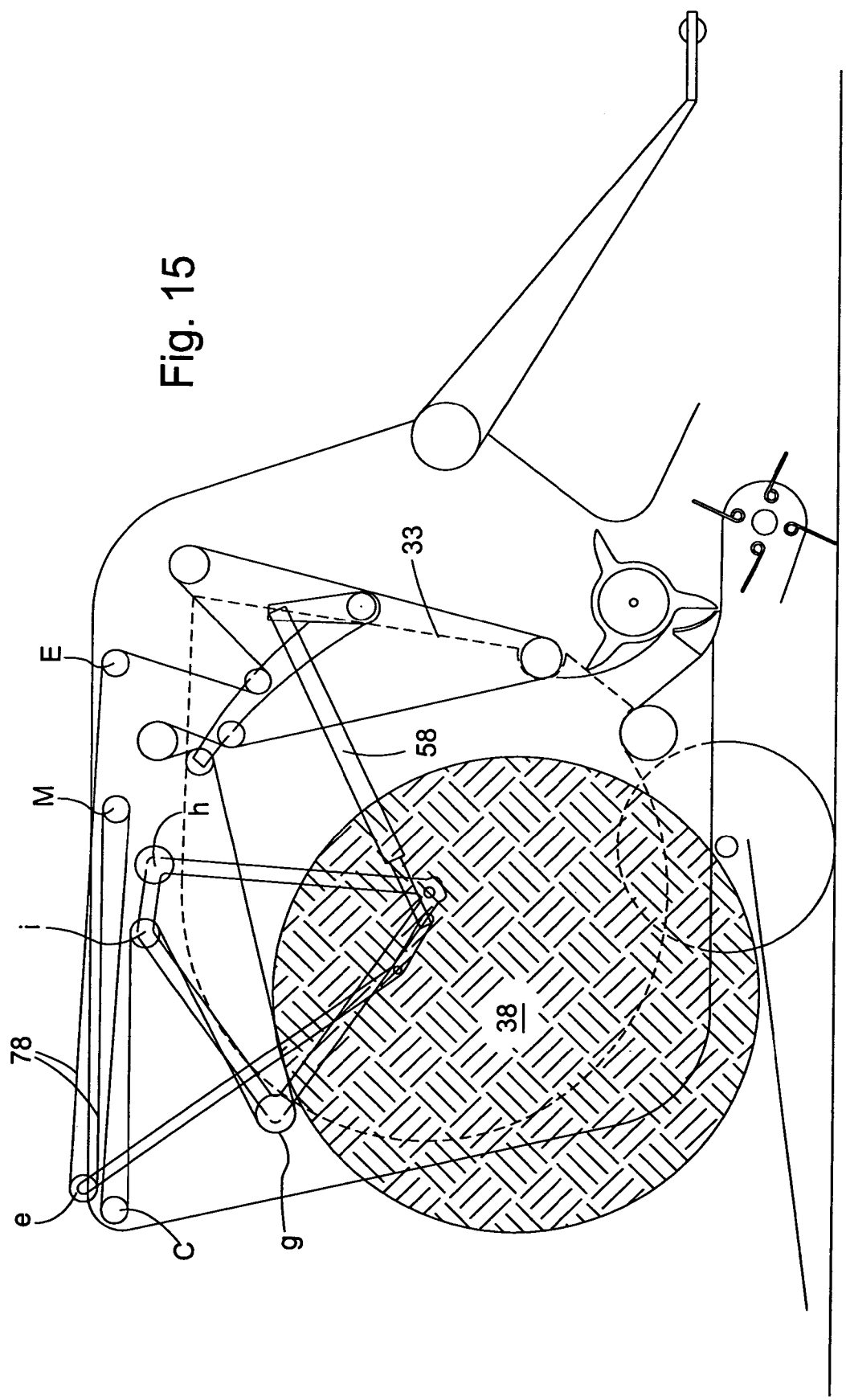
FIG. 15 shows the round baler of FIG. 13 with a completed bale during unloading.

FIGS. 13 to 15 illustrates a fifth embodiment, which is between the first and the second embodiment, except as far as the second pivot arm 16 is concerned and as the fixed rolls working in conjunction with roll e are rolls E and another fixed roll M. The first pivot arm 14 corresponds to the first pivot arm shown with respect to the first embodiment, it has three mobile rolls a to c, whereas the idling roll c is located between the rolls a and b and the pivot axis 40.

The second pivot arm 16 is journalled on axis 45, which is located slightly above and rearward of the center of the bale chamber 36 when it is completely filled. The legs 46 of the second pivot arm 16 are located outside the bale chamber 36. The lever arms 50 connecting the pivot arm 16 to the actuator 58 are formed as an almost straight extension of the pivot arm 16 and find themselves below the axis 45, when the bale chamber 36 is empty. At the end of the legs 46 remote from axis 45 only mobile roll e is present as well as a connection making the base of the "U". The form of the second pivot arm 16 and the location of the mobile roll e is chosen such, that roll e is always located above fixed roll C and may during the movement of the second pivot arm 16 follow a path above the upper edge of the side structure 32.

New fixed roll M is journalled in the side structures 32 or their walls and located very close, but slightly rearward and upward of roll D. The mobile roll e on the second pivot arm 16 always applies the strand of the baling means 22 between fixed rolls M and E to create a loop 78 of a little or huge extent. This loop 78 is used to take up slack in the baling means 22 when the bale 38 is unloaded.

Starting from mobile roll 20, ref. A, the route of the baling means is: F-c-E-e—between e and M-M-C-h—between h and i-g—between a and b-D—between a and b-A-F. The function of the round baler 10 in the fifth embodiment is described as follows. When the bale chamber 36 is empty, the first pivot arm 14 assumes its lowest position, the second pivot arm 16 assumes an almost 1:00 o'clock position with the roll e being almost immediately above fixed roll M and the unloading pivot frame 54 is in the lowermost position. During bale formation the first pivot arm 14 moves upwardly from an about 7:00 o'clock position in a clockwise direction to a substantially 11:00 o'clock position, while the second pivot arm 16 moves from a 1:00 o'clock position to a 1:30 o'clock position in order to give some length to the baling means during bale formation. As shown in FIG. 14, the length of the loop 78 decreases while the length of the actuator 58 increases.

When the bale 38 gets unloaded the actuator 58 is retracted and moves second pivot arm 16 counter clockwise from the front to the rear thereby creating and extending the loop 78 until it reaches roll C. This will take out the slack in the baling means as shown in FIG. 15. Meanwhile the first pivot arm 14 rests in the upper position.

It is therefore intended that the foregoing detailed description be regarded as illustrative rather than limiting, and that it be understood that it is the following claims, including all equivalents, that are intended to define the spirit and scope of this invention.

What is claimed is:

1. A round baler, comprising:
    a main body having transversely spaced, fixed side structures including an outer pair of side walls; and an inner pair of side walls respectively spaced laterally from said outer pair of side walls and including portions defining opposite ends of a bale chamber;
    a plurality of fixed rolls attached to said side structures and including a first fixed roll mounted to a lower front region of said side structures, a second fixed roll mounted to an upper front region of said side structures, a third fixed roll mounted to an upper rear region of said side structures, and a fourth fixed roll mounted to an upper middle region of said side structures;
    a first pivot arm attached to a front middle region of said side structures, at a location between said first and second fixed rolls, for swinging about a first pivot axis between a lowered bale starting position and a raised bale completed position, with said first pivot arm carrying first and second mobile rolls at an end region remote from said axis with said second mobile roll being located between said first mobile roll and said first axis;
    a second pivot arm attached to said upper middle region of said side structures, at a location spaced just rearward of said fourth fixed roll, for swinging about a second pivot axis between a lowered bale starting position and a raised bale completed position, with said second pivot arm carrying third and fourth mobile rolls at an end region remote from said second axis with said fourth mobile roll being between said third mobile roll and said second axis;
    an unloading pivot frame attached to said side structures for swinging between a lowered baling position and a raised unloading position about at third pivot axis, located approximately coincident with an axis of a completed bale located in said bale chamber, with said unloading pivot frame, as considered in said baling position, carrying a fifth mobile roll located approximately vertically below said end region of said first pivot arm, and carrying a sixth mobile roll located adjacent a lower rear region of said side structures, with said fifth mobile roll being down and to the rear from said first fixed roll so as to define an inlet to said bale chamber;
    a flexible, endless baling means including a loop routed between said first and second mobile rolls and over said fourth fixed roll, said loop diverging below said first and second mobile rolls, with a forward strand extending first about said first fixed roll then about said second fixed roll and with a rear strand extending first about said fifth mobile roll then about said third fixed roll and then about said fourth mobile roll; and
    a baling control means having an extensible and retractable first actuator having opposite ends respectively coupled to said first and second pivot arms, such that said first actuator is caused to extend during formation of a bale in the bale chamber.

2. The baler of claim 1, wherein said first actuator is a hydraulically driven linear motor.

3. The baler of claim 1, wherein said first actuator is an electrically driven motor.

4. The baler of claim 1 wherein said first actuator joins said pivot arms such that said pivot arms rotate in substantially the same direction.

5. The baler of claim 1 wherein said first and second pivot arms are located on a same side of said side structures that said bale chamber is located and respectively include first and second lever arms located on an opposite side of said side structures from said bale chamber.

6. The baler of claim 5 wherein said plurality of fixed rolls includes a fifth fixed roll located in an upper region of said side structures at a location between said second and fourth fixed rolls; and a seventh mobile roll being mounted to said first pivot arm at a location between said second mobile roll and said first axis, with said baling means extending from said second fixed roll, about said seventh mobile roll and then to said fifth fixed roll.

7. The baler of claim 1 wherein said third mobile roll is attached to one end of said second pivot arm; and said third mobile roll being located so as to operate as an idler engaging a length of said baling means extending between said first and fifth mobile rolls when said first and second pivot arms are in their respective bale complete positions and said unloading pivot frame is in said unloading position, the third mobile roll then preventing the latter mentioned length of said baling means from coming into engagement with the baling means at said fourth mobile roll.

8. The baler of claim 1 wherein said baling control means includes a resistance means for effecting a force which yieldably resists extension of said first actuator as said bale chamber is filled.

9. The baler of claim 6 wherein said second lever arm includes a leg which extends to an opposite side of said second axis from a location where said first actuator is attached to said second lever arm; and an eighth mobile roll being mounted to said leg and engaging a length of said baling means extending between said fifth fixed roll and said fourth mobile roll so as to prevent the latter mentioned length of said baling means from contacting the baling means at said fourth fixed roll.

* * * * *